United States Patent [19]
Fleischmann et al.

[11] Patent Number: 5,116,697
[45] Date of Patent: May 26, 1992

[54] HOT CLIMATE BATTERY AND MATERIALS FOR USE IN SAME AND METHODS AND APPARATUS FOR SAME

[75] Inventors: Charles W. Fleischmann, Blue Bell; Chester R. Sinnk, Boyertown; Veit, Jr., William E., Wyomissing Hills, all of Pa.

[73] Assignee: Exide Corp., Reading, Pa.

[21] Appl. No.: 396,383

[22] Filed: Aug. 18, 1989

[51] Int. Cl.⁵ .................. H01M 10/02; H01M 10/10
[52] U.S. Cl. .................................. 429/86; 429/126; 29/623.1
[58] Field of Search ................ 429/84, 86, 126; 29/623.1

[56] References Cited

U.S. PATENT DOCUMENTS

| | | | |
|---|---|---|---|
| 1,475,434 | 11/1923 | Kershaw et al. | 429/126 |
| 4,076,901 | 2/1978 | Fritz et al. | 429/126 |
| 4,749,606 | 6/1988 | Moore et al. | 428/178 |

Primary Examiner—Donald L. Walton
Attorney, Agent, or Firm—Frank J. Benasutti

[57] ABSTRACT

We have discovered that the introduction of small particulate matter into the area between the electrolyte and the inner surface of the battery cover can dramatically reduce water loss, if the material possess the following properties:

The material should have a closed cell, which is not a solid material in a sense that it is a plurality of hollow structures linked together.

6 Claims, 4 Drawing Sheets

HOT CLIMATE BATTERY AND MATERIALS FOR USE IN SAME AND METHODS AND APPARATUS FOR SAME

FIELD OF THE INVENTION

This invention relates to electric storage batteries and more particularly to methods, material and a battery for use in hot climates to reduce water loss from the battery.

BACKGROUND OF THE INVENTION

As is well known in the prior art most types of electric storage batteries generate combustible gases during their operation which gases are vented from the battery into the atmosphere. These gases can be ignited and cause explosions. Methods of controlling these explosions include placing materials such as fibers, plastics, glass materials in the space between the top of the electrolyte and the bottom of the battery cover to, allegedly, provide one or more advantages in the controlling of explosions. However, little is known in the prior art of providing any means for controlling the evaporation of water from the battery.

For example, in the prior art, Heinz Fritz et al. U.S. Pat. No. 4,076,901, the battery which operates at an elevated temperature, includes a vaporization-resistent layer over the electrolyte consisting of floating solid particles or a liquid, specifically referred to as paraffin oil.

H. E. Jensen described in his 1944 U.S. Pat. No. 2,341,382 the use of a material loosely disposed within the upper portion of the battery, which was held above the battery electrolyte level and thereby displaced the volume of gases within that area. No mention was made of controlling water loss.

More recently, patents such as that to Binder et al. U.S. Pat. No. 4,751,154, showed the use of a porous, compressible plastic material to attenuate the explosion of combustible gases accumulating in the battery. This material was described as having a unique bimodal pore distribution including a major portion of small pores effective for attenuation and a minor portion of large pores effective in gas and electrolyte management. The patent emphasizes that both open cell and fibrous materials may be utilized for these purposes. Once again, there is no mention of controlling the amount of water loss in the battery.

This latter patent also describes the materials as having reticulated or non-reticulated structures; defining non-reticulated as "not all of the cells are fully open although the material is permeable" and reticulated as "the cell membranes or bubbles are completely broken or open, resulting in higher permeability."

In spite of this prior art, little is known of methods for reducing water loss in batteries used in hot climates. For example, while the use of oil has proved effective, explosion testing of batteries has proved that flammable oil contributed to that hazard. Similarly, dense particles tend to contribute to the hazard of explosion.

Water loss in a battery can become extremely severe in hot climates, especially in locations where relative humidity is also low. The situation is worsened by the increasingly cramped space allowed under the hood of cars as the automotive designs become more aerodynamic. Underhood temperatures as high as 200° F. have been measured and battery temperatures up to 180° F. Thus a battery design which would reduce water loss would be beneficial especially in hot climates. Without proper maintenance, such as water additions, the specific gravity of the sulfuric acid electrolyte rises steadily, causing decreased battery life. If no water is added during its life, the battery may fail due to water loss.

Accordingly, it is an object of this invention to provide a method and material means for dramatically reducing water loss without increasing the likelihood of explosion. This and other objects of the invention will become apparent from the following description.

While we have discovered a material to aid in reducing the battery water loss, we have also developed an apparatus for inserting that material into that battery during assembly. Although the material and method are not known in the prior art, there is art on vacuum guns to accumulate small particulate matter and discharge it such as guns used in the pharmaceutical industry as, for example, those produced by Kinematics and Controls Corp. of Deerpark, N.Y.

SUMMARY OF THE INVENTION

We have discovered that the introduction of small particulate matter into the area between the electrolyte and the inner surface of the battery cover can dramatically reduce water loss, if the material possesses the following properties:

The material should have a closed cell, which is not a solid material in a sense that it is a plurality of hollow structures linked together.

Further, the material should be disposed in a layer of at least a ¼ of an inch for evaporative purposes.

The material should be able to float and not form a wetted paste nor absorb electrolyte.

The particles of the material should be mobile in order to accommodate activity within the battery and a variety of cross sections as the electrolyte drops.

The material should not wick up electrolyte nor encourage pumping with expansion of electrolyte due to heat as in the case of materials which fill the space within the battery or are compressed within that space, so as to take it all up.

Finally, in order to be effective, the material should reduce water loss at high temperatures such as when exposed to hot, arid climate conditions of 160° F. and 20% relative humidity in a 24 hour period on the order of 20% or more over conventional batteries not using the material.

Since the material picks up electrostatic charges, we have discovered that using a static eliminating device in conjunction with a vacuum gathering and dispelling device provides a ready means for commercial production when used in the assembly of the batteries.

DESCRIPTION OF THE PREFERRED EMBODIMENTS

The material is a closed cell (also known as closed pore) foam. It is not an open celled (open pore) foam nor a fibrous material. It is not a bimodal material. It is used in the form of small particles. Sufficient material to provide the needed depth requires differing volumes per cell depending on the size of the battery. A typical automotive battery, for example, will require 100 to 140 cc per cell.

In the preferred embodiment the small particles are such as those that are available as: (1) pre-expanded expandable polystyrene which, for example, may be obtained by pre-expanding Dylite 34RB from ARCO Chemical Company or its equivalent from BASF. These materials are normally available only from producers of closed pore structural foam products such as packaging materials or foam dishware because those are intermediates in the process;(2) pre-expanded expandable polyethylene - polystyrene copolymer or pre-expanded expandable styrene - acrylonitrile. The pre-expanded expandable polyethylene - polystyrene copolymer, for example, is obtained by pre-expanding ARCEL 512 obtained from ARCO Chemical Company; (3) pre-expanded expandable polyolefins (polyethylene, polypropylene) which may be obtained from suppliers such as ARCO Chemical Company; or (4) by chopping into suitable small pieces expanded polystyrene materials, such as packaging materials, prepared from precursor materials available from companies such as BASF, ARCO Chemical Company or DOW Chemical Company. The material is not compressed as it is put into the battery and then expanded, so that it does not take up all of the space. If it did, it may cause pumping. In the most preferred form that we have discovered to date, the materials have a particle size ranging up to $\frac{1}{4}$ of an inch.

Further this material should be a non-explosion enhancing material and for that purpose we consider material having a low density of 1.2 to 2.5 lbs/cubic ft. (0.02–0.04 g/cc) to be desirable. This prevents the material itself from acting as a missile upon explosion of the battery.

The material should occupy several layers most preferably and should always be capable of floating. Hollow glass bubbles tend to wet and make a paste and foams with open cells tend to absorb electrolytes and are not acceptable.

The low density particulate material may be conveniently introduced into the cell container of a battery by simple transfer operations. It is preferable to add the material after the electrolyte has been introduced into the cell and adjusted for quantity and specific gravity.

Figure 1:
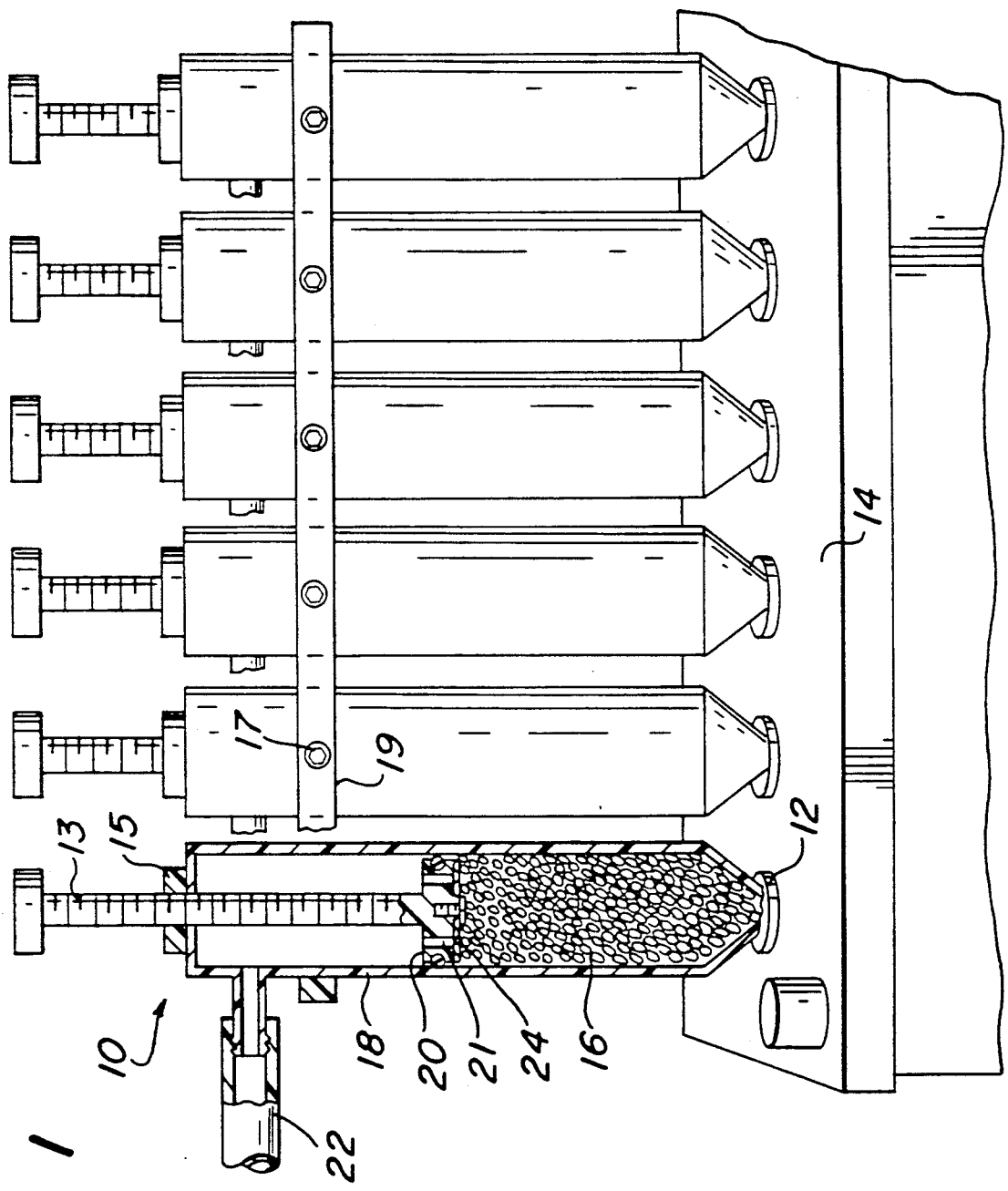
FIG. 1 is a perspective view partially broken away showing a portion of the apparatus engaged with the battery prior to loading of the material.
Figure 2:
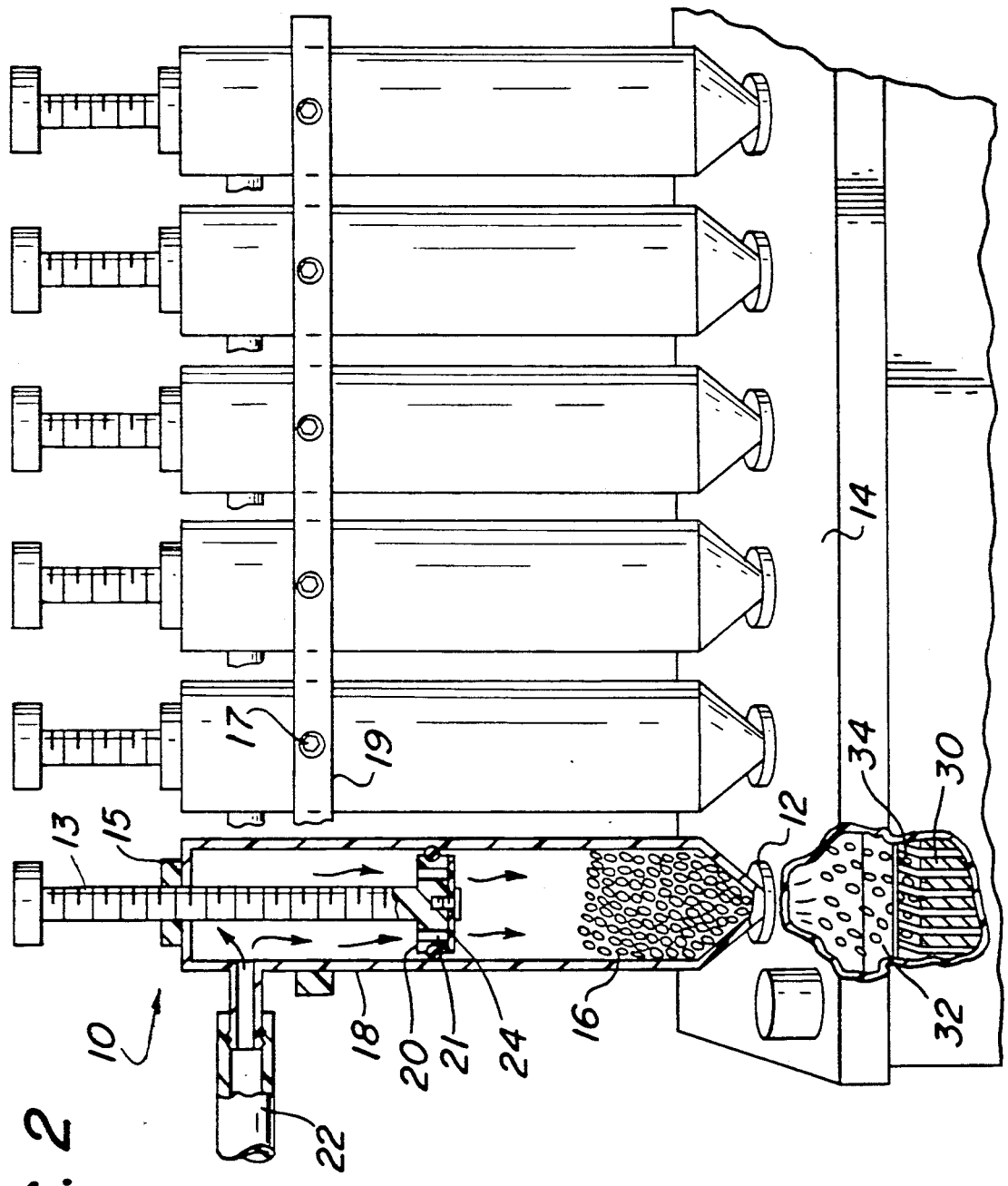
FIG. 2 is a view similar to FIG. 1 showing the material during loading into the battery.

It is desirable to fill all the cells of a given battery simultaneously as the battery progresses through the production line. To assure that the desired quantity is delivered to each cell, separate metering of the amount per cell is preferred. One transfer mechanism 10 FIG. 1 uses six ganged loading guns 18 which align with the six vent holes 12 in the battery cover 14. Each of the gun 18 is connected in a gang form by a suitable means such as one or more straps 19 bolted to the gun by means of the machine screw 17 or the like. As shown in FIG. 1, the gun 18 is a cylinder with a piston 20 connected to a piston rod 13 which is threadably mounted through a sealed connection in the top end of the cylinder and which may be locked by a locking nut 15 to fixedly adjust the position of the piston within the cylinder. Thus, the volume of material 16 or charge delivered by each gun 18 may be adjusted by means of the piston 20. The amount of material necessary will vary depending upon the battery configuration being used. The guns pick-up the material from a supply bin (not shown) by means of low vacuum introduced through line 22. To enable the evacuation of the gun on both faces of the piston, the piston has four holes (21) drilled through it. Because the holes are large enough (3/16 inch diameter) to pass the smaller particulate matters, a 50 mesh plastic screen 24 is attached on the face toward the particles. When negative pressure is applied it sucks particulate matter into the bottoms of the guns since air is drawn through the screen and through the holes 21 and out the tube 22. The ganged charged guns are then moved into position over the battery with the ends of the guns penetrating into the battery vent holes 12, FIGS. 1 and 2. The charge is released from the gun by changing from a negative to positive pressure as shown in FIG. 2. The material descends into the space above the battery plates 30, the conductive strap 32 and the electrolyte 34 and piles up on top in that space over the plates, electrolyte and strap.

The nature of the particles is such that they readily pick up electrostatic charges which causes them to cling together and to other objects. To facilitate this transfer, therefore, a blower-type static eliminator is mounted behind the battery so as to blow ionized air across the battery cover into the area of the storage bin (not shown, but positioned in front of the battery).

EXAMPLES

The characteristics of the particulate foam in the following example are: (1) a density significantly less than 1 g/cc preferably in the range of 0.02 to 0.05 g/cc; (2) a closed cell foam; (3) a particle size that promotes tight packing; and (4) a material that was inert in a lead-acid battery.

This material formed a layer which floated on the surface of the electrolyte and had no effect on the electrochemistry or electrical performance of the battery.

Figure 3:
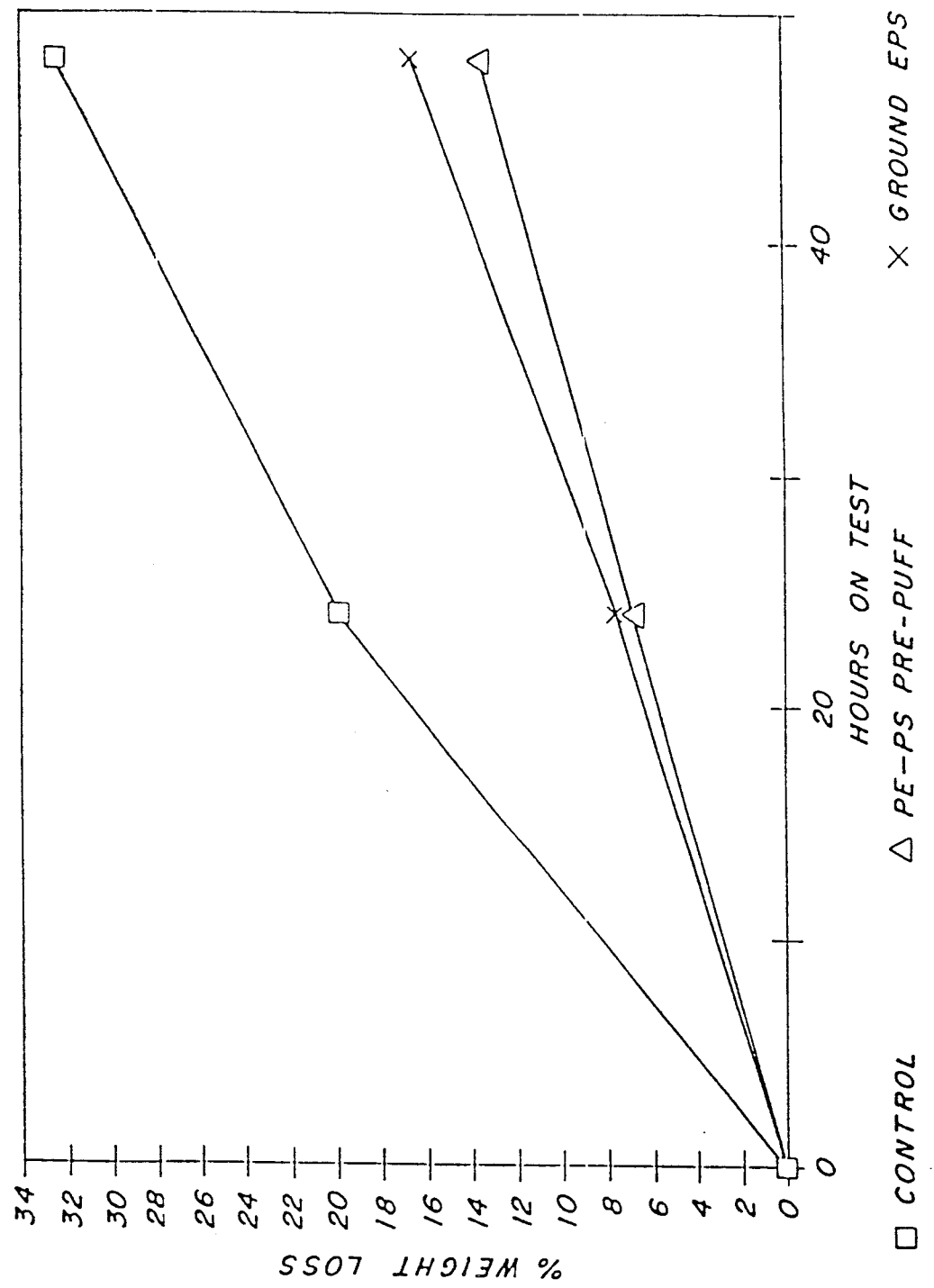
FIG. 3 is a graph showing the evaporative weight loss of water, in percent, from sulfuric acid electrolyte using PE-PS prepuff and ground EPS as cover materials.

The materials found to be effective thus far, have been 1) ground expanded polystyrene (styrofoam), 2) pre-expanded expandable polystyrene (pre-puffs EPS) and 3) pre-expanded expandable polyethylene-polystyrene copolymer (pre-puff PE-PS). FIG. 3 shows a comparison of the evaporative loss in weight percent from 1.265 specific gravity sulfuric acid using cover materials 1 and 3 and no cover material. The test was conducted by placing 100 ml of acid into 150 ml glass beaker. The quantity of cover material was 40 cc, loosely packed. The layer of cover material was 4/8–$\frac{5}{8}$ inch thick. Three samples of each test material were used. The test was conducted by placing the samples into a chamber wherein the the temperature held at 160° F. and the relative humidity at 20%. The loss in electrolyte with time was determined gravimetrically. Sulfuric acid electrolyte of 1.265 specific gravity is composed of 35.6% $H_2SO_4$ and 64.4% water. Since even at the boiling point, sulfuric acid solutions of less than 85% $H_2SO_4$ evaporate water exclusively, (see for interest, Kirk-Othmer *Encyclopedia of Chemical Technology*, Third Edition, Volume 22, John Wiley & Sons, New York, 1983), all the evaporative loss shown in FIG. 3 is water loss.

Figure 4:
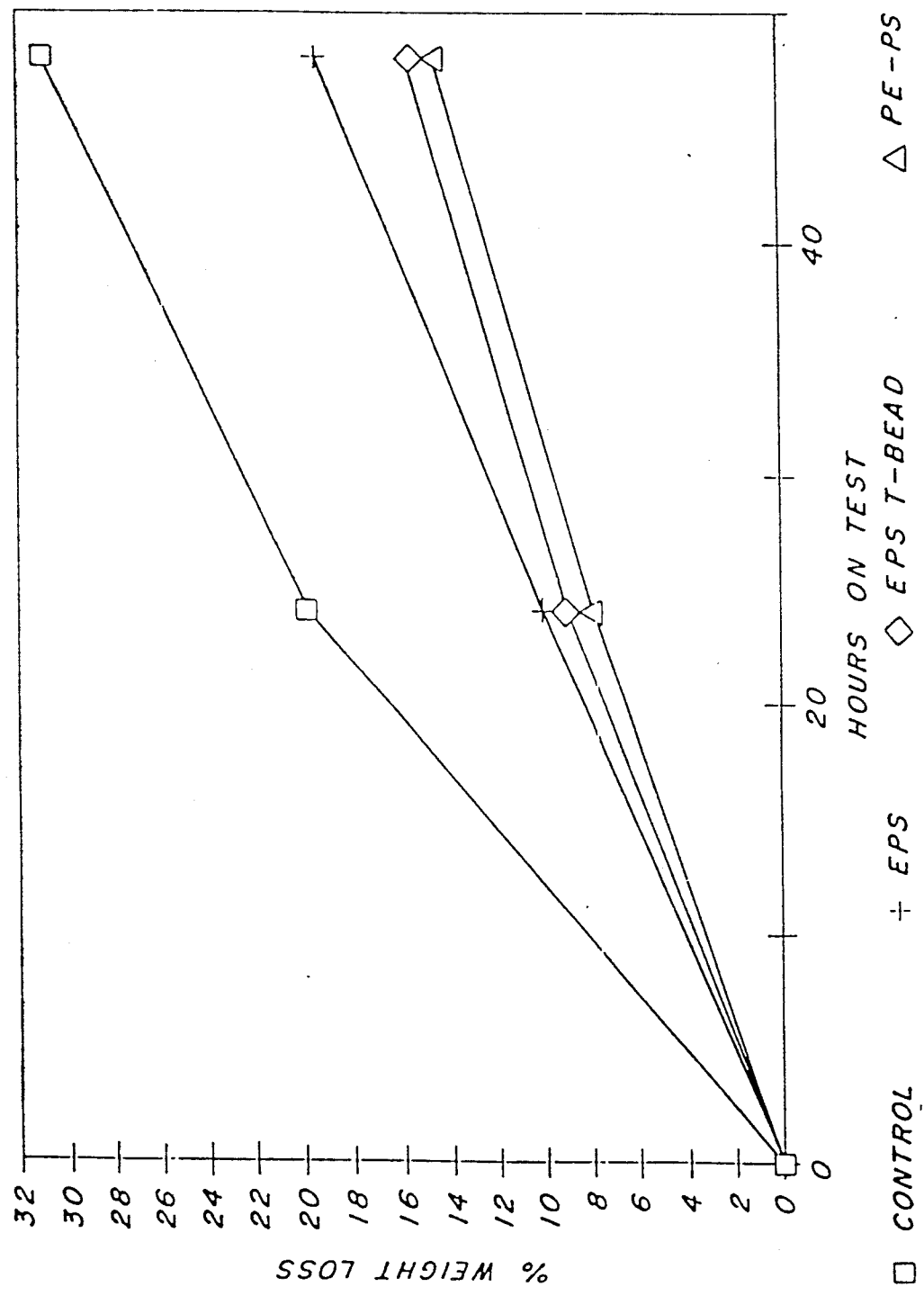
FIG. 4 is a graph showing the evaporative weight loss of water, in percent, form sulfuric acid electrolyte using two different size particles of EPS T-bead and PE-PS pre-expanded expandable polystyrene as cover materials.

On the chart, FIG. 3, the term 20% RH refers to relative humidity. Another set of data are shown in FIG. 4. The test method and quantities of acid and cover materials were the same as for the previous test that provided the data for FIG. 3. In this test, however, five duplicate samples of each test material were used.

The "control" for both sets was a beaker of acid with nothing on the surface.

In FIG. 4, two sizes of pre-puff EPS are shown and one size of pre-puff PE-PS. The pre-puff EPS was expandable polystyrene closed cell foam (that is the walls of the cells completely enclose the bubbles in the foam product). The pre-puff EPS "T" bead was the smallest and the ARCO Arcel (PE-PS) was the largest.

In FIG. 3 and FIG. 4 the weight loss of acid solutions vs time on test are shown. The weight loss is not linear with time because the acid is continuously concentrating and the rate of water loss falls off with acid concentration.

When considering the percent weight lost for example, if 100 g of acid, in 24 hours lost 20 g (the acid being the total solution) then one could calculate the percent of water lost. The 100 grams of 1.265 specific gravity acid originally contained 64.4 g of water. After 20 grams of water is lost by evaporation, the 80 grams of acid remaining contains 35.6 g of $H_2SO_4$ and 44.4 g of water. The water was decreased by 31%. It is to be noted that the acid during that period would get more concentrated to a specific gravity of 1.34 g/cc after 20 grams are lost.

Each point on the chart of FIG. 3 is an average of 3 samples, and FIG. 4 is an average of 5 samples.

The benefit provided by the cover materials is readily seen from the figures. The control samples, after 24 hours, lost 20 weight percent (FIGS. 3 and 4). The weight loss, after 24 hours, for the samples with ground styrofoam was only 8 weight percent (60% less), for the pre-expanded expandable polystyrene (pre-puff EPS) it was only 9 or 10 weight percent (50-55% less) (FIG. 4), and for the pre-expanded expandable polyethylene polystyrene copolymer it was 7 (FIG. 3) or 8 (FIG. 4) weight percent (60-65% less). After 48 hours, the covered samples still showed a 31-60% reduction in weight loss. After 48 hours the uncovered acid had become considerably more concentrated (approximately 1.425 specific gravity) compared to the covered acid (approximately 1.34 specific gravity), and therefore it lost water at a lower rate. The greater variation in the data for different cover materials after 48 hours is attributed to slight differences in the wettability of the types of particles. The pre-puff material from Tuscarora Plastics (FIG. 4), for example, was known to be scrap material and would be expected to be more wettable because of surface impurities. We have run these tests and they are reproducible and comparable. However, they were not done in batteries, but just done in beakers.

In another example, the materials used in the beaker studies were introduced into small lead acid batteries (type 12N14-3A Yuasa-Exide). These batteries were received dry-charged and activated by adding sulfuric acid electrolyte of sp. gr. 1.265. After filling with measured quantities of acid and the normal conditioning of boost charging, they were allowed to degas overnight prior to adding the cover materials. The electrolyte levels were all initially adjusted to 13/16 inch below the top of the covers or approximately 17 cc per cell above the top of the plates.

Batteries 1-3 had no cover material added. They served as controls. Three of the cover materials evaluated in the beaker studies were selected for use in the tests and they are identified as they were for the previous tests. Twenty cc of ARCO PE-PS pre-puff were added to each cell of battery numbers 4, 5, and 6. Twenty cc of ARCO DYLITE pre-puff "T" bead were added to each cell of battery numbers 7, 8 and 9. Twenty cc of a pre-puff material obtained from Tuscarora Plastics were added to each cell of battery numbers 10, 11, and 12. To accelerate the water loss for test purposes the filler plugs were omitted from the cells. After 24 hours in a hot, dry environment, provided via a controlled temperature/humidity oven, 160° F. and 20% relative humidity, the water loss was determined by the weight loss per battery as for the beaker studies and the percentage weight loss relative to the initial acid quantity per cell was determined. The measurement for battery number 4 was rejected from the data as it is different by 100% from the duplicate cell numbers 5 and 6. The anomaly was later traced to an oven location which effected more rapid evaporation, presumably due to non-uniform air flow. The data show 24 to 46 percent less water loss from the cells containing the cover material.

TABLE 1

| Battery No. | Cover Material | Wt. of Battery Without Electrolyte | Wt. of Electrolyte Added, gms. | Weight Loss After 24 hrs., 160° F. and 20% RH | % Wt. Loss Column 5/4 × 10 |
|---|---|---|---|---|---|
| 1 | None (Control) | 3481.0 | 1040.0 | 41.0 | 3.9 |
| 2 | None (Control) | 3360.0 | 1017.0 | 43.0 | 4.2 |
| 3 | None (Control) | 3343.5 | 1033.5 | 48.0 | 4.6 |
| Av. | | | | | 4.2 |
| | ARCO PE-PS | | | | |
| 4 | Pre-puff | 3318.0 | 1027.0 | 62.0 | (Rejected) |
| 5 | " | 3395.0 | 1011.0 | 32.0 | 3.2 |
| 6 | " | 3307.5 | 1028.5 | 32.0 | 3.1 |
| Av. | | | | | 3.2 |
| | ARCO DYLITE | | | | |
| 7 | Pre-puff | 3390.0 | 1029.0 | 26.0 | 2.5 |
| 8 | "T" bead | 3375.0 | 1016.0 | 25.5 | 2.5 |
| 9 | " | 3306.0 | 1077.0 | 22.0 | 2.1 |
| Av. | | | | | 2.4 |
| | Pre-puff EPS From Tuscarora Plastics | | | | |
| 10 | | 3602.5 | 989.5 | 29.0 | 2.9 |
| 11 | | 3451.0 | 1017.0 | 35.0 | 2.5 |
| 12 | | 3415.5 | 1016.5 | 32.0 | 3.2 |
| Av. | | | | | 2.9 |

In addition to the benefit of reduced evaporative water loss, we have found that the particulate foam provides additional benefit of significantly reducing the magnitude of a battery explosion, should it occur. In batteries where the electrolyte is at normal operating levels, the particulate foam reduces the explosive force to the point that there is little or no damage to the battery as compared to a ruptured cover and container in batteries without the particulate foam. This is so, even though, as in the preferred embodiment, there is insufficient foam material to fill the area between the electrolyte and the cover. However, it is desirable to have at least a ½ an inch of material in that space for explosion proof enhancing qualities; whereas it is only necessary to have on the the order of ¼ of an inch of material in that space to gain the advantages of evaporative control.

It will be understood that various changes in the details, materials and arrangement of all parts which have been herein described and illustrated in order to explain the nature of this invention may be made by those skilled in the art within the principle and scope of the invention expressed in the following claims.

What is claimed is:

1. In an electric storage battery including a substantially closed container, electrode elements and an electrolyte disposed within the container, and a normally open space within the container above the elements and electrolyte, an improved material for insertion into said space to form a floating layer on the electrolyte to reduce evaporative water loss in operation of the battery at elevated temperatures, the improved material comprising:

particles of closed cell foam material having sizes of less than one quarter inch in longest section and density in the range of 0.02 to 0.05 grams per cubic centimeter.

2. The invention of claim 1 wherein the closed cell material is selected from the group consisting of: ground expanded polystyrene, pre-expanded expandable polystyrene, pre-expanded expandable polyethylene-polystyrene copolymer, pre-expanded expandable polyethylene, pre-expanded expandable polypropylene and pre-expanded expandable styrene acrylonitrile.

3. An electric storage battery including a substantially closed container, electrode elements and an electrolyte disposed within the container, vent means in the container for the release of gas generated by the electrochemical reaction within the cell, and a space within the container above the elements and the electrolyte:

further including within said space a layer of particles of a closed cell foam material which floats on the electrolyte and which does not fill the space between the electrolyte and the bottom of the cover, said particles having sizes of less than one quarter inch in longest section and a density in the range of 0.02 to 0.05 grams per cubic centimeter.

4. The invention of claim 3 wherein the closed cell material is selected from the group consisting of: ground expanded polystyrene, pre-expanded expandable polystyrene, pre-expanded expandable polyethylene-polystyrene copolymer, pre-expanded expandable polyethylene, pre-expanded expandable polypropylene and pre-expanded expandable styrene acrylonitrile.

5. A method of preparing a battery for use in hot climates to reduce evaporative water loss over conventional batteries comprising the steps of:

introducing into said battery particles of closed cell foam material in sufficient quantity to form a solid layer of material at least one quarter inch in thickness which floats on the electrolyte in said battery and which does not fill the space between the electrolyte and the battery cover, said particles having sizes less than one quarter inch in longest section and density in the range of 0.02 to 0.05 grams per cubic centimeter.

6. A method of preparing a battery in accordance with claim 5 wherein the material is selected from the goup consisting of: ground expanded polystyrene, pre-expanded expandable polystyrene, pre-expanded expandable polyethylene-polystyrene copolymer, pre-expanded expandable polyethylene, pre-expanded expandable polypropylene and pre-expanded expandable styrene acrylonitrile.

* * * * *